United States Patent [19]

Janke et al.

US005726216A

[11] Patent Number: 5,726,216

[45] Date of Patent: Mar. 10, 1998

[54] TOUGHENED EPOXY RESIN SYSTEM AND A METHOD THEREOF

[75] Inventors: Christopher J. Janke, Oliver Springs; George F. Dorsey, Farragut; Stephen J. Havens, Knoxville, all of Tenn.; Vincent J. Lopata, Manitoba, Canada

[73] Assignee: Lockheed Martin Energy Systems, Inc., Oak Ridge, Tenn.

[21] Appl. No.: 676,768

[22] Filed: Jul. 8, 1996

Related U.S. Application Data

[63] Continuation-in-part of Ser. No. 507,569, Jul. 26, 1995.

[51] Int. Cl.$^6$ .............................. C08J 3/28; C08G 59/18; C08G 65/26; C08G 65/28

[52] U.S. Cl. .............................. 522/31; 522/129; 522/146; 522/170; 528/405; 528/407; 528/408

[58] Field of Search .............................. 522/31, 129, 146, 522/170

[56] References Cited

U.S. PATENT DOCUMENTS

| | | | |
|---|---|---|---|
| 3,649,337 | 3/1972 | Johnson et al. | 117/93.31 |
| 4,201,640 | 5/1980 | Watt | 204/159.11 |
| 4,256,828 | 3/1981 | Smith | 430/280 |
| 4,318,766 | 3/1982 | Smith | 156/330 |
| 4,394,403 | 7/1983 | Smith | 427/42 |
| 4,593,051 | 6/1986 | Koleske | 522/31 |
| 4,885,319 | 12/1989 | Dougherty et al. | 522/31 |
| 4,935,320 | 6/1990 | Rohde et al. | 430/14 |
| 4,977,199 | 12/1990 | Koleske et al. | 522/31 |
| 5,141,970 | 8/1992 | McArdle et al. | 522/170 |
| 5,260,349 | 11/1993 | Crivello | 522/31 |
| 5,268,489 | 12/1993 | Koleske et al. | 549/215 |
| 5,302,438 | 4/1994 | Komamura et al. | 428/195 |
| 5,328,940 | 7/1994 | Zimmer | 522/31 |
| 5,350,604 | 9/1994 | Crivello | 427/512 |

FOREIGN PATENT DOCUMENTS

| | | | |
|---|---|---|---|
| 0 499 542 A1 | 2/1992 | European Pat. Off. | 267/10 |

OTHER PUBLICATIONS

T. C. Walton (Aspen Systems, Inc.) and J. V. Crivello, "Innovative Composite Fabrication Using Electron–Beam Rapidly Cured, Micrometeroid and Atomic Oxygen Resistant EFS Polymers," *39th International SAMPE Symposium*, Apr. 11–14, 1994, 497–513.

Norio Okada, Tsutoma Asano, Motoyoshi Hatada, Jun–ichi Takezaki, and Koichi Ochi, "Electron Beam Curing of Bisphenol A Epoxy Resins," *Kibunshi Ronbunshu*, 44(10), 1987, 761–770.

A. Udagawa, Y. Yamamoto, Y. Inoue, R. Chujo, T. Sasaki, and I. Ishigaki, "Plasticization and antiplasticization effects of sulfonium salt initiator fragments remaining in cycloaliphatic epoxy resins cured by electron beam and ultraviolet radiation," *Polymer*, 33(2), 1992, 264–267.

M. Hatzakis, K. J. Stewart, J. M. Shaw, and S. A. Rishton (IBM), "New High–Resolution and High–Sensitivity Deep UV, Xray, and Electron–Beam Resists," *J. Electrochem. Soc.*, 138(4), 1991, 1076–1079.

K. J. Stewart, M. Hatzakis, J. M. Shaw, and D. E. Seeger (IBM), "Simple negative resist for deep ultraviolet, electron beam, and x-ray lithography," *J. Vac. Sci. Technol. B.*, 7(6), 1989, 1734–1739.

M. Hatzakis, K. J. Stewart, J. M. Shaw, and S. A. Rishton (IBM), "New, High Resolution and High Sensitivity Deep UV, Xray, and Electron Beam Resists," *Microelectronic Engineering*, 11, 1990, 1487–490.

Per–Erik Sundell, Sonny Jonsson, and Anders Hult, "High–Energy–Radiation–Induced cationic Polymerization of Vinyl Ethers in the Presence of Onium Salt Initiators," in Radiation Curing of Polymeric Materials, Charles E. Hoyle and James F. Kinstle, Editors, ACS Symposium Series 417 (1990).

Anders Hult, Sonny Jonsson, Eva Malmstrom, Per–Erik Sundell, "EB and γ Induced Acid Formation by Onium Salts in Organic Liquids," *Aspects of Photoinitiation*, Ink and Radcure Services, PRA, Egham, England, Oct. 19–20, 1993, 50–64.

K. Dietliker, "Chemistry & Technology of UV & EB Formulation for Coatings, Inks & Paints," *Volume III Photoinitiators for Free Radical and Cationic Polymerization*, 1991, SITA Technology Ltd., London.

M. Braithwaite, R. S. Davidson, R. Holman, C. Lowe, P.K.T. Oldring, M. S. Salim, C. Wall, "Chemistry & Technology of UV & EB Formulation for Coatings, Inks & Paints," *Volume IV, Formulation*, ed. P.T.K. Oldring, p. 157, 1991, SITA Technology Ltd., London.

Heiner Bayer and Bernhard Stapp (Siemens AG), "Photo–and Thermoinitiated Curing of Epoxy Resins by Sulfonium Salts," *RadTech Europe May 2 to 6, 1993 Mediterraneo*, 451–463.

Antoine Carroy (Union Carbide Chemicals and Plastics), "Comparison of Reactive Diluents in Cationic UV–Curable Formulations," *RadTech Europe May 2 to 6, 1993 Mediterraneo*, 489–500.

AECL Accelerators, "The I–10/1 Industrial Electron Accelerator," Nov. 1991.

AECL Accelerators, "The High Energy, High Power Choice in Industrial Accelerators IMPELA," Oct. 1993.

James V. Crivello, Mingxin Fan, and Daoshen Bi, "The Electron Beam–Induced Cationic Polymerization of Epoxy Resins," *Journal of Applied Polymer Science*, vol. 44, 9–16 (1992).

(List continued on next page.)

*Primary Examiner*—Susan W. Berman
*Attorney, Agent, or Firm*—Ivan L. Ericson

[57] ABSTRACT

Mixtures of epoxy resins with cationic initiators are curable under high energy ionizing radiation such as electron beam radiation, X-ray radiation, and gamma radiation. The composition of this process consists of an epoxy resin, a cationic initiator such as a diaryliodonium or triarylsulfonium salt of specific anions, and a toughening agent such as a thermoplastic, hydroxy-containing thermoplastic oligomer, epoxy-containing thermoplastic oligomer, reactive flexibilizer, rubber, elastomer, or mixture thereof. Cured compositions have high glass transition temperatures, good mechanical properties, and good toughness. These properties are comparable to those of similar thermally cured epoxies.

8 Claims, No Drawings

OTHER PUBLICATIONS

R. Stephen Davidson and Susan A. Wilkinson, "Electron-beam-induced polymerization of epoxides," *J. Photochem. Photobiol. A: Chem.*, 58 (1991) 123–314.

J. V. Crivello, "Cationic Polymerization–Iodonium and Sulfonium Salt Photoinitiators,", *Advances in Polymer Science* 62, Springer–Verlag Berlin Heidelberg 1984, pp. 1–42.

N. Glezos, I. Raptis, D. Tsoukalas, and M. Hatzakis, "Application of a new analytical technique of electron distribution calculations to the profile simulation of a high sensitivity negative electron–beam resist," *J. Vac. Sci. Technol.*, B10(6), Nov./Dec. 1992, 2606–2609.

Richard J. Batten, R. Stephen Davidson, and Susan A. Wilkinson, "Radiation curing of an epoxy–acrytate–6, 7–epoxy–3,7–dimethylactyl acrylate," *J. Photochem. Photobiol. A:Chem*, 58 (1991), 115–122.

TOUGHENED EPOXY RESIN SYSTEM AND A METHOD THEREOF

CROSS REFERENCE TO RELATED APPLICATION

This application is a continuation-in-part application under 37 C.F.R. §1.53 of U.S. patent application Ser. No. 08/507,569, pending filed Jul. 26, 1995, the entire disclosure of which is incorporated herein by reference.

This invention was made with Government support under contract DE-AC05-4OR21400 awarded by the U.S. Department of Energy to Lockheed Martin Energy Systems, Inc. and the Government has certain rights in this Invention.

FIELD OF THE INVENTION

The present invention relates to a epoxy resin system and to methods of making and using this resin system more particularly, to a toughened epoxy resin system and to the corresponding methods of making and using such a system. The epoxy resin system of the present invention can be incorporated into electron beam curable polymer matrix composites (PMCs).

BACKGROUND OF THE INVENTION

For the most part the polymerization or curing of monomers to high molecular weight or highly cross linked polymers by means of high energy electron beam radiation has been limited to a few general types of monomers. Monomers containing acrylate and methacrylate groups have been extensively used as electron beam curable coatings and adhesives. Monomers containing carbon-carbon double bonds, such as vinyls, allenes, and dienes, are also known to be electron beam curable. These monomers react by means of free radical mechanisms. Under high energy ionizing radiation, such as electron beams, they require no free radical initiators. However, these monomers tend to be toxic and expensive. Of greater concern is the limited value for many applications of the polymers produced by cross linking these materials. This is due to drawbacks including low glass transition temperature (or low service temperature), low mechanical properties (such as toughness, strength, and modulus), and high shrinkage when cured.

What is desired is a means by which higher performance resins can be processed and cured by means of electron beam radiation, and still achieve the same thermal and mechanical properties as when thermally cured. A recent patent by Aerospatiale (Eur. Pat. Appl EP 499,542) described a process by which bismaleimides can be cured at ambient temperature by electron beam radiation to yield materials with good mechanical properties and glass transition temperatures in excess of 300° C. Coreactive diluents were added to the bismaleimides to make them processable at lower temperatures.

Epoxy resins are much more widely used than bismaleimides, although their thermal properties are not quite as high. Epoxies are produced in hundreds of millions of pounds annually and are widely used in a variety of applications (L. V. McAdams and J. A. Gannon, "Epoxy Resin", *Encyclopedia of Polymer Science and Technology*, John Wiley & Sons). A method of curing epoxy resins by means of electron beam radiation would therefore be of considerable value. Visible-ultraviolet curing of thin films of cycloaliphatic epoxies using a cationic initiator is well known (J. V. Crivello, *Advances in Polymer Science*, Vol. 61, p.1, 1984).

However, these processes are limited to thin coatings due to the low penetration of visible-ultraviolet radiation. Thermal and mechanical properties of these materials are low and curing is incomplete. There has been little reported success with the electron beam curing of epoxies. Crivello (J. V. Crivello, M. Fan, and D. Bi:, *Journal of Applied Polymer Science*, Vol. 44, p.9, 1992; U.S. Pat. No. 5,260,349) has recently disclosed a series of highly reactive cycloaliphatic silicone epoxies which are electron beam curable in the presence of certain cationic photoinitiators (diaryliodonium and triarylsulfonium salts). Crivello further reported that 3', 4'-epoxycyclohexylmethyl-3,4-epoxycyclohexanecarboxylate and commercially available bisphenol A based epoxies cured poorly under the same conditions. Massive doses of electron beam radiation were required. Others (R. S. Davidson and S. A. Wilkinson, *Journal of Photochemistry and Photobiology A: Chemistry*, Vol. 58, p.123, 1991 and T. Okada, T. Asano, M. Hatada, J. Takezaki, and K. Ochi, Kobunshi Ronbunshu, Vol. 44, p. 761, 1987) have also reported that examples of these same types of photoinitiators do not lead to complete electron beam curing of certain cycloaliphatic epoxies and bisphenol A based glycidyl ethers. Thermal postcuring subsequent to ambient temperature electron beam curing is required to achieve a more complete degree of cure.

The U.S. application Ser. No. 08/507,569 parent to this application, disclosed that conventional epoxy resins can be fully cured at ambient temperature to high glass transition temperatures (essentially the same as or higher than with thermal curing). Cationic initiators are also required for this process. The process also requires ionizing radiation produced by an electron beam accelerator. The main difficulty associated with the cured epoxy resins is that they are brittle. While much research has been devoted to the toughening of thermally cured epoxies, there are no reports in the literature of any means to toughen epoxies which are radiation cured using cationic initiators.

Radiation cured epoxy resins incorporating cationic photoinitiators tend to be very brittle. Resins for many structural and non-structural applications including composites, adhesives, and coatings for use in aircraft, aerospace, marine, transportation applications, sporting goods, or other consumer products must have sufficient toughness and impact resistance to endure many years of harsh service. What is needed is a means by which radiation cured cationic epoxies can be toughened and still retain the good thermal and mechanical properties of the original composition. This invention describes a variety of toughening agents which can be incorporated into the epoxy resin initiator mixture. These toughening agents include thermoplastics, hydroxy-containing thermoplastic oligomers, epoxy-containing thermoplastic oligomers, reactive flexibilizers, elastomers, rubbers, and mixtures thereof. An additional advantage obtained by the use of low viscosity reactive flexibilizers is reduction of the overall viscosity of the uncured resin mixture. Incorporation of one or more of these toughening agents has resulted in increases in toughness of more than 230% over that of the untoughened epoxy resin.

OBJECTS OF THE INVENTION

Accordingly, it is an object of the present invention to provide a toughened epoxy resin composition. It is an additional object of the present invention to provide a method for making a toughened epoxy resin system from the toughened epoxy resin composition.

Further and other objects of the present invention will become apparent from the description contained herein.

SUMMARY OF THE INVENTION

In accordance with one aspect of the present invention, a new and improved toughened epoxy resin composition comprises an epoxy resin, a cationic initiator, and a toughening agent. The cationic initiator is selected from the group consisting of a diaryliodonium salt of a specific anion, a triarylsulfonium salt of a specific anion and combination thereof. The toughening agent is selected from the group consisting of a thermoplastic, hydroxy-containing thermoplastic oligomer, epoxy-containing thermoplastic oligomer, reactive flexibilizer, rubber, elastomer, and mixtures thereof.

In accordance with another aspect of the present invention, a new and improved method for making a toughened epoxy resin system comprises the following steps:

Step 1. A toughened epoxy resin composition is provided. The toughened epoxy resin composition comprises an epoxy resin, a cationic initiator, and a toughening agent. The cationic initiator is selected from the group consisting of a diaryliodonium salt of a specific anion, a triarylsulfonium salt of a specific anion and combination thereof.

Step 2. The toughened epoxy resin composition is exposed to high energy ionizing radiation for a period of time sufficient to cure the epoxy resin system, there by forming a cured toughened epoxy resin system.

In accordance with another aspect of the present invention, a new and improved method for making a toughened epoxy resin system comprises the following steps:

Step 1. A toughened epoxy resin composition is provided. The toughened epoxy resin composition comprises an epoxy resin, a cationic initiator, and a toughening agent. The cationic initiator is selected from the group consisting of a diaryliodonium salt of a specific anion, a triarylsulfonium salt of a specific anion and combination thereof.

Step 2. The toughened epoxy resin composition is exposed to high energy radiation from the sun for a period of time sufficient to cure the epoxy resin system forming a cured toughened epoxy resin system.

DETAILED DESCRIPTION OF THE PREFERRED EMBODIMENTS

This invention describes toughened epoxy resins, compositions, and methods for preparing them, by which these compositions are cured or cross linked by means of radiation induced cationic polymerization. It was found that epoxy resins can be cured at, below, or above ambient temperatures to high glass transition temperatures (essentially the same as, or higher than, with thermal curing), while still exhibiting the same mechanical properties as thermally cured materials. A cationic initiator at a concentration of 0.25 to 10 parts per hundred of the epoxy resin is required for this process. Upon irradiation by ionizing radiation the initiator produces a cationic species (positively charged ion) which initiates the cationic cure of the epoxy resins. The mechanism of the cationic curing of epoxies is well known (L. V. McAdams and J. A. Gannnon, "Epoxy Resins", Encyclopedia of polymer Science and Engineering, John Wiley and Sons). Ionizing radiation refers to high energy radiation such as X-rays, gamma rays, and electron beam (e-beam) radiation. E-beam radiation as produced by an accelerator is particularly useful. In addition, high energy radiation from the sun and high energy ultraviolet radiation can be used.

Additional advantages obtained from this process are the lack of mechanical stresses, which result from thermal curing, and reduced manufacturing expenses related to faster curing times, lower energy requirements, and the elimination of expensive thermal processing equipment.

The process of the invention of the '569 application can be used in the areas of coatings, encapsulants for electronic devices, adhesives, molded and cast parts, and laminates and composites with fiber reinforcement. Unlike the cationic curing of epoxy resins with visible or ultraviolet light, the use of a penetrating high energy electron beam to initiate the curing reaction means that thick sections of material can be completely and uniformly cured. Thus, thick composite parts can now be fabricated and cured at any temperature at or above the glass transition temperature of the epoxy monomers in relatively short periods of time with minimal residual mechanical stresses.

The primary problem associated with epoxy resins cured by this process is that they are sometimes too brittle to be used for certain applications. The present inventors have discovered that this brittleness problem can be solved by a toughening agent which can be added to the epoxy resin/initiator blend. Requirements of this toughening agent are: that it be miscible with or form a stable suspension with the epoxy resin/initiator composition; that it not interfere with the cationic curing mechanism; and, that it not significantly reduce the thermal and mechanical properties of the cured resin. The present inventors are unaware of any mention in the literature of any tougheners for use with epoxy resins that are cured by means of ionizing radiation induced cationic polymerization. A variety of toughening agents and flexibilizers have been used with thermally cured epoxy resins, which typically use an amine coreactant or hardener for cross linking. These tougheners include: rubbers or elastomers, either as discrete particles or reacted with epoxy resin, epoxy functionalized flexibilizers, engineering thermoplastics, and amine or hydroxy-terminated thermoplastic oligomers. However, the utility of these materials in toughening epoxy resins cured by radiation induced cationic polymerization is difficult to predict.

Specifically, this invention relates to epoxy resin system compositions and to the radiation curing thereof, wherein the compositions comprise an epoxy resin monomer or mixtures of epoxy resins monomers (Part A), an initiator (Part B), and a toughener (Part C).

The epoxy resin monomer (Part A) may be virtually any of a variety of commercially available materials. The glycidyl ethers of various phenolic compounds are particularly important. These include the glycidyl ethers of bisphenol A as given by the following formula where n ranges from 0 to 12:

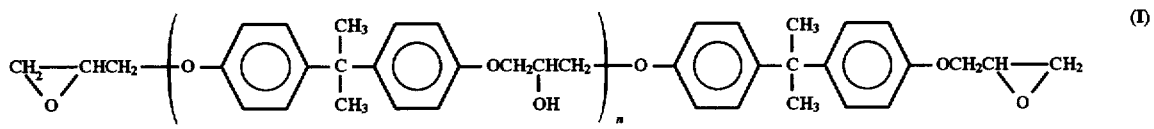

These resins are widely available from a number of manufacturers such as Shell Chemical Company, DOW Chemical Company, and Ciba-Geigy Corporation in a variety of molecular weights and viscosities. Examples include: D.E.R. 332, D.E.R. 330, D.E.R. 331, D.E.R. 383, D.E.R. 661, TACTIX 123, TACTIX 138, and TACTIX 177 (DOW trademarks); EPON 825, EPON 826, and EPON 828 (Shell trademarks); and, ARALDITE GY 6008, ARALDITE GY 6010, and ARALDITE GY2600 (Ciba-Geigy trademarks).

Additionally, flame retardant epoxy resins can be used including fluorinated or brominated bisphenol type epoxy resins, such as D.E.R. 542 and D.E.R. 566-A80 from DOW Chemical Company.

Another important class of glycidyl ethers are those of phenolic novolac and cresol novolac resins as given by the following formula where n ranges from 0 to 8:

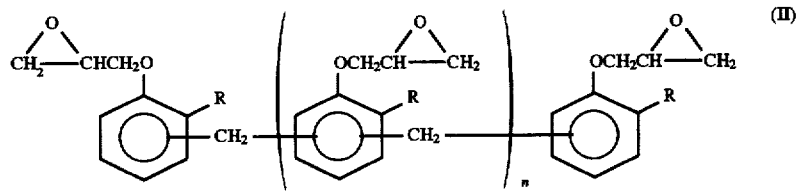 (II)

For epoxy phenolic novolacs, R=H, and for epoxy cresol novolacs, R=CH$_3$. For bisphenol F epoxy resins R=H and the value of n is low (0 to 0.15). These materials are also widely available from a number of manufacturers in a variety of molecular weights and viscosities. Examples include Epon 862, Epon 155, (Shell trademarks); D.E.R. 354, D.E.N. 431, D.E.N. 438, and D.E.N. 439 (DOW trademarks); and ARALDITE PY 306, ARALDITE EPN 1139, ARALDITE EPN 1138, ARALDITE GY 281, ARALDITE GY 285, ARALDITE GY 302-2, ARALDITE LY 9703, ARALDITE XD 4955, and ARALDITE ECN 9511 (Ciba-Geigy trademarks).

A similar epoxy that may also be used is SU-8 (Shell Trademark).

Several other polyfunctional glycidyl ethers are of significant importance for high performance applications i.e. heavy mechanical loads under conditions of high temperature and harsh environment. The materials include:

The tetraglycidyl ether of tetrakis (4-hydroxyphenyl) ethane, which is commercially available as EPON 1031 (Shell Chemical trademark) and ARALDITE MT 0163 (Ciba-Geigy trademark).

The diglycidyl ether of 9, 9- bis (4-hydroxyphenyl) fluorene is commercially available as EPON HPT 1079 (Shell Chemical TRADEMARK).

Glycidyl ethers of the condensation product of dicyclopentadiene and phenol are available such as TACTIX 556 (DOW Chemical trademark) as given by the following formula where n is approximately 0.2:

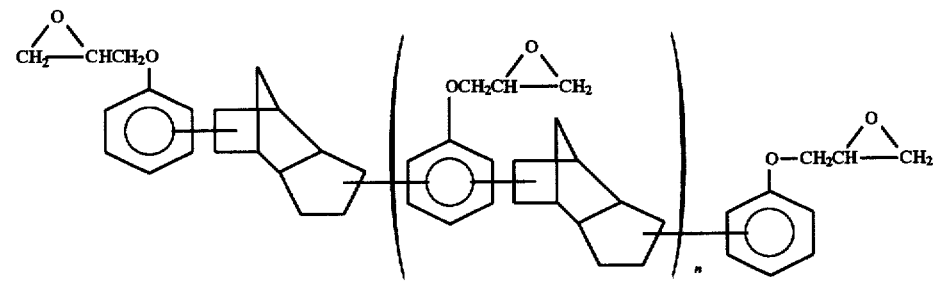 (III)

The triglycidyl ether of tris (hydroxyphenyl) methane, which is available as TACTIX 742 (DOW Chemical trademark) or as XD9053.

These latter materials, EPON 1031, EPON HPT 1079, TACTIX 556, TACTIX 742 and XD9053, are either high viscosity liquids or solids at room temperature. Therefore it is advantageous to blend these materials with a low viscosity bisphenol A or bisphenol F based diglycidyl ether or reactive diluents. The resulting blends are less viscous at ambient temperatures and are more easily processed. Some heating may be required for adequate flow, but the temperatures needed are not high enough to cause thermal curing of the epoxy group. Specific blends were found to have a good overall combination of low viscosity in the uncured state and high glass transition temperature, flexural strength, and modulus when cured. It was found to be particularly advantageous to blend a high performance semi-solid epoxy such as TACTIX 556, TACTIX 742 or EPON HPT 1079, with a low viscosity bisphenol A or bisphenol F based glycidyl ether epoxy such as EPON 862, TACTIX 123, or a reactive diluent.

Cycloaliphatic epoxies represent another group of epoxies useful in the present invention. They are usually low viscosity liquids at room temperature and can either be used alone or as reactive diluents in blends with the semi-solid glycidyl ether epoxies. These materials include 3',4'-epoxycyclohexylmethyl 3,4-epoxycyclohexanecarboxylate, which is available as ERL-4221 (Union Carbide Corporation trademark) and ARALDITE CY-179 (Ciba-Geigy trademark); diglycidylester of hexahydrophthalic anhydride which is available as CY 184 (Ciba-Geigy trademark); bis (3,4-epoxycyclohexylmethyl) adipate, which is available as ERL-4299 (Union Carbide trademark); the isomeric mixture of bis (2,3-epoxycyclopentyl) ether, which was once available as ERL-4205 (Union Carbide trademark); ERL-4205 reacted with ethylene glycol or blended with a bisphenol A based diglycidyl ether, which were once available from Union Carbide as ERLB-4617 and ERL-2258(Union Carbide trademarks), respectively.

The epoxy resin monomer (Part A) as just described may also be advantageously modified by mixing it with various additives. Such additives include polyols such as ethylene glycol, propylene glycol, 1,3-butylene glycol, 1,4-butylene glycol, and other glycols. Aromatic diphenols and polyphenolic compounds may also be used to modify the epoxy resin. Other reactive diluents, which contain vinyl, acrylate, or methacrylate may be employed to change reactivity, glass transition temperature, or mechanical properties. In addition, reactive diluents based on monofunctional or polyfunctional glycidyl ethers may also be used to reduce the viscosity or modify the resin systems. Additionally, nonreactive diluents, such as acetone, have been found to be useful for reducing the viscosity of the resin system which improves the processibility of the material before it is cured for certain applications, such as solvent based prepreg.

The initiator (Part B) for the present invention is a material which produces a positively charged species (cation) when subjected to ionizing radiation. This positively charged species must then be capable of initiating the cationic polymerization of the epoxy (Part A). Much research has been devoted to the development of cationic photoinitiators (J. V. Crivello, *Advances in Polymer Science*, Vol. 62, p. 1, 1984). Cationic initiators react when subjected to visible or ultraviolet light of a particular wavelength to produce a cationic species, typically a Bronsted acid. It was previously determined that some of these initiators also react to generate cations when subjected to ionizing radiation. The behavior of these materials when subjected to higher energy ionizing radiation, such as produced by an electron beam accelerator or a gamma cell, is difficult to predict. Diaryliodonium salts and triarylsulfonium salts of certain anions are particularly effective as initiators for the ionizing radiation induced cationic polymerization of epoxies. Many examples of each have been reported and some are commercially available. Almost all could be useful in the present invention.

Specific examples of diaryliodonium salts am given by the following formula, where $R_1$ and $R_2$ are radicals such as H, methyl, ethyl, n-propyl, isopropyl, n-butyl, tertbutyl Cl Br, $C_nH_{2n+1}$, $OC_nH_{2n+1}$, $OCH_2CH(CH_3)C_nH_{2n+1}$, $OCH_2CH(C_2H_5)C_nH_{2n+1}$, $OCH_2CH(OH)C_nH_{2n+1}$, $OCH_2CO_2C_nH_{2n+1}$, $OCH(CH_3)CO_2C_nH_{2n+1}$, $OCH(C_2H_5)CO_2C_nH_{2n+1}$, and mixtures thereof where n is an integer between 0 and 18:

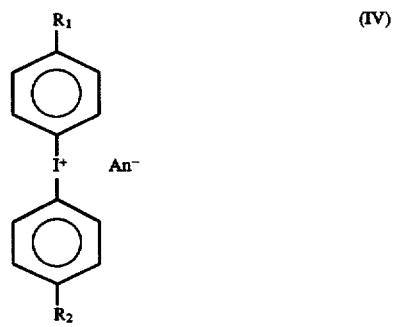

(IV)

$An^-$ denotes the anion which may be hexafluoroarsenate ($AsF_6$), hexafluoroantimonate ($SbF_6$), hexafluorophosphate ($PF_6$), boron tetrafluoride (BF4), trifluoromethane sulfonate ($CF_3SO_3$), tetrakis (pentafluorophenylborate), ($B[C_6F_5]_4$), or tetrakis [3,5-bis(trifluoromethyl) phenyl]borate ($B[C_6H_3(CF_3)_2]_4$). For example, OPPI in Tables 1-4 denotes (4-octyloxyphenyl) phenyliodonium hexafluoroantimonate ($R_1$=H, $R_2$=OC$_8$H$_{17}$, $An^-$=SbF$_6$ ). This initiator, which was obtained from General Electric Corporation as Aryl Fluoroantimonate Product 479-2092 as well as another fluoroantimonate initiator, CD-1012 from the Sartomer Company ((4-(2-hydroxytetradecyloxy)phenyl phenyliodonium hexafluoroantimonate) were found to be particularly effective with certain epoxy resins. However, the present inventors have found that initiators with other $R_1$ and $R_2$ substituents would be expected to exhibit similar reactivities.

Specific examples of triarylsulfonium salts are given by the following formulas, where $R_3$ is H, methyl, ethyl, n-propyl, isopropyl, n-butyl, tert-butyl, phenylsulfide (PhS), phenoxy (PhO) and $An^-$ denotes the anion, which may be the same as those of the diaryliodonium salts:

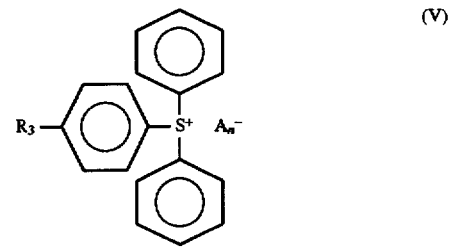

(V)

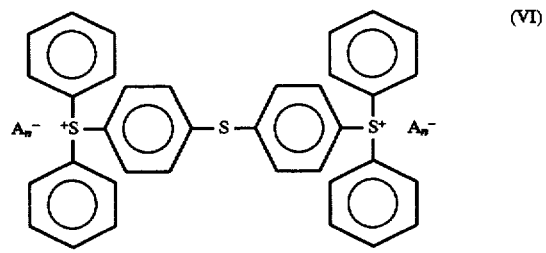

(VI)

Examples of commercially available triarylsulfonium salts are CYRACURE UVI-6974 and CYRACURE UVI-6990 which are available from Union Carbide Corporation. These are mixtures of the triarylsulfonium salts given by the formula (V) and formula (VI) above where $R_3$ is phenylsulfide and $An^-$is are the hexafluoroantimonate and hexafluorophosphate anions, respectively. Degussa Corporation DEGACURE KI-85 and 3M Corporation FX-512 are both mixtures of triarylsulfonium hexafluorophosphate salts.

The toughener or flexibilizer (Part C) may be any of a variety of materials. High molecular weight engineering thermoplastics are particularly effective in increasing the toughness of the radiation cured epoxy mixture as measured by fracture toughness ($K_{1c}$). Polysulfones such as UDEL and RADEL (Amoco Performance Products, Inc.) can be dissolved in the epoxy resin/initiator composition to form a viscous homogeneous mixture. Toughness of the cured composition is significantly improved in comparison with the untoughened epoxy resin (Examples 1 and 2, Table 1). Similar results were obtained with a polyetherimide such ULTEM (General Electric Company) as given by Example 3. It is not necessary for the thermoplastic to be miscible with the epoxy resin/initiator composition. The addition of Nylon 12 and Nylon 6/12 particles, ELF ATOCHEM ORGASOL 2001 and ORGASOL 3501, respectively, resulted in improved fracture toughness even though these materials were insoluble in the epoxy resin monomer mixture. Similar results were obtained using insoluble polyimide particles, IMITEC X-902. Other thermoplastics such as polyamideimides, poly(arylene ethers), polyesters, polyarylates, polycarbonates, polyurethanes, and others are potentially useful as Part C of the present invention. Examples can be found in "Engineering Plastics,"D. C. Clagett, *Encyclopedia of Polymer Science and Engineering*, John Wiley and Sons.

Engineering thermoplastics are typically endcapped with nonreactive functional groups. It may also be advantageous for the toughening agent of Part C to be a low molecular weight segment or oligomer of a previously described engineering thermoplastic, which contains functional groups that are capable of reaction with the epoxy resin during radiation induced cationic polymerization. Accordingly, thermoplastic materials that have been modified to contain a thermoplastic oligomer backbone and to have more reactive end groups are particularly useful as tougheners To this end hydroxy-terminated polysulfone oligomers based on the UDEL P-1700 polymer backbone were synthesized at various molecular weights (Example 4 and Table 1). These materials are more easily blended with the epoxy resin monomer/photoinitiator mixture and the resulting compositions are less viscous than those having the same percentage of high molecular weight polymer of similar backbone, but with different end groups. These materials were also found to be very effective in increasing fracture toughness. Oligomers with other backbones can also be used, particularly those of poly(arylene ethers), polyarylates, and polyester. Conceivably, the oligomer backbone could be that of any of the previously referenced thermoplastics. Reactive end groups are those which react with the epoxy resin during cationic polymerization. These groups include hydroxy, epoxy, and carboxylate groups.

Flexible molecules which contain two or more epoxy groups represent a class of material which is also useful as Part C of this invention. These compounds typically contain long aliphatic groups which act to reduce crosslink density in the cured epoxy resin. In addition to increasing the fracture toughness of the cured epoxy resin, the addition of low viscosity flexibilizers can also significantly reduce the overall viscosity of the uncured epoxy resin/initiator/flexibilizer mixture. Specific examples are given in Examples 5 and 6, and in Table 2. Useful flexibilizers include but are not limited to: 1,4-butanediol diglycidyl ethers (such as SHELL HELOXY MODIFIER 67), neopentlyglycol diglycidyl ether (such as SHELL HELOXY MODIFIER 68), cyclohexane dimethanol diglycidyl ether (such as SHELL HELOXY MODIFIER 107), trimethylol ethane triglycidyl ethers (such as SHELL HELOXY MODIFIER 44), dibromoneopentyl glycol glycidyl ethers (such as SHELL HELOXY MODIFIER 56), propoxylated glycerol polyglycidyl ether (such as SHELL HELOXY MODIFIER 84), polypropylene glycol glycidyl ether (such as SHELL HELOXY MODIFIER 32), polyglycidyl ether of castor oil (such as SHELL HELOXY MODIFIER 505), dimer acid diglycidyl esters (such as SHELL HELOXY MODIFIER 71), resorcinol diglycidyl ether (such as SHELL HELOXY 69), epoxidized soybean oils (such as ELF ATOCHEM VIKOFLEX 7170), epoxidized linseed oils (such as ELF ATOCHEM VIKOFLEX 7190, methyl epoxy soyates (such as ELF ATOCHOM VIKOFLEX 7010), epoxidized propylene glycol dioleates (such as ELF ATOCHEM VIKOFLEX 5075), epoxy esters (ELF ATOCHEM VIKOFLEX 4050), 1,2-tetradecane oxides (such as ELF ATOCHEM VIKOFLEX 14), internally epoxidized 1,3-butadiene homopolymers (such as ELF ATOCHEM POLY BD 600 and POLY BD 605), diglycidyl ether, glycidyl glycidate, bis(2,3-epoxy-2-methylpropyl)ether, and polyglycoldiepoxides (such as DOW Chemical DER 732 and DER 736). Flexible molecules which contain two or more hydroxy groups are also useful as Part C of this invention. These flexible polyol compounds also contain long aliphatic groups. Useful polyols include E-caprolactone triol (such as UNION CARBIDE TONE 0301, 0305, 0310).

Elastomers or rubbers may also be used as Part C. Examples of these materials include, but are not limited to, the copolymers of styrene, butadiene, and ethylene or styrene, butylene, and ethylene (such as SHELL KRATON rubber), butadiene, styrene copolymers, copolymers of butadiene and styrene, butyl rubber, neoprene rubber, and poly (siloxanes). Functionalized versions of these materials such as carboxyl terminated poly (n - butylacrylate) rubber are particularly useful. Epoxy resin monomers of Part A may be reacted with these materials to form an epoxy terminated elastomer which is useful as Part C. Maleic anhydride terminated KRATON rubber (such as SHELL Chemical - FG 1901X), and epoxy functionalized liquid KRATON rubbers (such as SHELL Chemical - EKP-206 and EKP-207) are especially useful as Part C. Specific examples are given in Examples 7-9 and in Table 3.

It is also advantageous to blend the various types of tougheners or flexibilizers in order to achieve toughness through different toughening mechanisms and to adjust the overall viscosity of the uncured epoxy resin/initiator/toughener composition i.e., Parts A, B, and C combined. A flexibilizer may be added to a mixture of a thermoplastic or thermoplastic oligomer dissolved in an epoxy resin monomer. Overall viscosity may be reduced and toughness may be improved compared with using a toughener or flexibilizer alone. The thermoplastic may separate from the radiation cured epoxy to form a two phase morphology while the flexibilizer provides long flexible groups to connect crosslink sites in the epoxy network. Specific examples are given in Table 4.

The following examples illustrate the formulation and curing of the toughened epoxy mixtures. The invention is not limited to these examples.

EXAMPLE 1

10% UDEL P-1700 NT with TACTIX 123

Amoco UDEL P-1700 NT Polysulfone (30 g) in pellet form was added to 270 g of Dow TACTIX 123 (high purity bisphenol A based glycidyl ether) in a three neck flask equipped with a mechanical stirrer, nitrogen inlet, and a thermocouple probe. The mixture was stirred under nitrogen at approximately 150° C. until the thermoplastic dissolved to form a high viscosity solution (24 h). The temperature of the solution was reduced to approximately 90° C. and 9.00 g of (4-octyloxyphenyl)phenyliodonium hexafluoroantimonate, OPPI, was added to the stirred mixture. Mixing was complete after 0.5 h. At 60° C. the viscosity of the mixture was 7300 cp. The mixture was degassed under vacuum at approximately 80° C., poured hot into aluminum molds, and the specimens irradiated using an electron beam accelerator (Energy, 10 MeV; Power, 1 kW). Specimens were irradiated in three passes of 50 kGy per pass for a total dosage of 150 kGy. Fracture toughness ($K_{1c}$) as determined according to ASTM E399 was 0.680 MPa $m^{1/2}$ at 25° C. and 0.899 MPa $m^{1/2}$ at $-100°$ C. Glass transition temperature (Tg) as determined by Dynamic Mechanical Analysis (DMA) was 168° C. (peak, Tan delta curve) and 156° C. (peak, loss modulus curve, G"). Flexural modulus was estimated by DMA to be 2.94 GPa at 25° C. The temperature at which the modulus was 50% of the 25° C. value was 132° C. (initial service temperature). After 48 h in boiling water the specimens absorbed 1.25% moisture.

EXAMPLE 2

20% RADEL A-200NT with TACTIX 123

Amoco RADEL A-200 NT (60 g) in pellet form was dissolved in approximately 300 mL of methylene chloride. The RADEL solution was mixed at room temperature with 240 g of Dew TACTIX 123 (mixture complete in 1-2 h with stirring) and the methylene chloride removed under vacuum at 90° C. (approximately 0.5 h). OPPI (9 g) was added and dissolved in the stirred mixture at 90° C. (approximately 0.5 h). Viscosity of the mixture at 60° C. was 24,000 cp. Specimens were cured as described in Example 1. Fracture toughness was determined to be 0.494 and 0.612 Mpa m$^{1/2}$ at 25° C. and −100° C., respectively. Glass transition temperature was 168° C. (Tan delta) and 143° C. (G"). Flexural modulus was 2.68 GPa at 25° C. with an initial service temperature of 129° C. Water absorption after 48 h water boil was 1.37%.

EXAMPLE 3

10% ULTEM 1000 with TACTIX 123

General Electric ULTEM 1000—1000 polyetherimide (60 g)in pellet form was dissolved in approximately 300 mL of methylene chloride. The ULTEM solution was mixed at room temperature with 540 g of Dow TACTIX 123 (mixture complete in 1–2 h with stirring) and the methylene chloride removed under vacuum at 90° C. OPPI (18 g) was added and dissolved in the stirred mixture at 90° C. (approximately 0.5 h). Specimens were cured as described in Example 1. Fracture toughness was 0.696 and 0.877 MPa m$^{1/2}$ at 25° C. and −100° C., respectively. Glass transition temperature was 175° C. (Tan delta) and 157° C. (G"). Flexural modulus was 3.07 GPa at 25° C. with an initial service temperature of 136° C. Water absorption after 48 h water boil was 1.37%.

EXAMPLE 4

30% Hydroxy-Terminated Polysulfone Oligomer (Mn, 6000 g/mole) with Tactix 123

Hydroxy-terminated polysulfone oligomers were prepared according to a method described in the literature [J. E. McGrath, T. C. Ward, E. Shehori, and A. J. Wnuk, *Polym. Eng. Sci.* 17, 647 (1977)]. The following example illustrates the preparation of a hydroxy-terminated polysulfone oligomer with a calculated molecular weight (Mn) of 6000 g/mole, based on a stoichiometric imbalance (r=0.929) using excess hydroxy-containing monomer. This example further illustrates the use of this material to toughen a bisphenol A based glycidyl ether mixture which was cured by means of electron beam radiation. 2,2-Bis (4-hydroxyphenyl) propane, (bisphenol A), (228.29 g, 1.000 mole), bis (4-chlorophenyl) sulfone (266.78, 0.929 mole), powdered anhydrous potassium carbonate (282.5 g, 2.044 mole), N,N-dimethylacetamide (1173 mL), and toluene (125 mL) were added to a 2 L three necked flask equipped with a thermocouple, nitrogen inlet, mechanical stirrer, and a Dean-Stark trap topped by a reflux condenser. With heating provided by a heating mantle the stirred mixture was slowly heated to approximately 140° C. under an atmosphere of flowing nitrogen. Water was removed over a period of several hours, then the toluene was removed through the Dean-Stark trap and the temperature of the reaction mixture allowed to reach 155° C. The reaction mixture was maintained at 155° C. overnight (20 h), cooled to approximately 100° C., and filtered through a fritted glass funnel. The filtrate was acidified by the addition of glacial acetic acid (57 mL, 1.00 mole) mixed with 200 mL of N,N-dimethylacetamide and precipitated into a total of 4–5 L of water in a blender. The precipitated polymer was collected by filtration, washed with water, and dried in air at 105° C. and under vacuum at 90° C. Yield of hydroxy-terminated polysulfone oligomer was 423.8 g (99.2% yield). Glass transition temperature as determined by Differential Scanning Calorimetry was 169° C. and inherent viscosity was 0.13 dL/g at 0.5% concentration in chloroform at 25° C. The hydroxy-terminated polysulfone oligomer (90 g) was added to 210 g of Dow TACTIX 123 and the mechanically stirred mixture heated at 120°–130° C. until the polysulfone oligomer dissolved (1–2 h). The temperature of the solution was reduced to approximately 90° C. and OPPI (9 g) added to the stirred mixture. After 0.5 h mixing was complete. Viscosity of the solution was 29,000 cp at 60° C. Specimens were cured as described in Example 1. Fracture toughness was 0.705 and 1.114 MPa m$^{1/2}$ at 25 and −100° C., respectively. Glass transition temperature was 161° C. (Tan delta) and 149° C. (G"). Flexural modulus was 3.02 GPa at 25° C. with an initial service temperature of 134° C. The percent weight gain after 48 hour water boil was 1.64%.

EXAMPLE 5

10% VIKOFLEX 7170 with TACTIX 123

Elf Atochem ATO VIKOFLEX 7170 (epoxidized soybean oil), (60 g), OPPI (18 g), and Dow TACTIX 123 (540 g) was mixed at approximately 80° C. Viscosity of the solution was 3600 cp at 24° C. Specimens were cured as described in Example 1. Fracture toughness was 0.598 and 0.752 MPa m$^{1/2}$ at 25 and −100° C., respectively. Glass transition temperature was 151° C. (Tan delta) and 133° C. (G"). Flexural modulus was 2.79 GPa at 25° C. with an initial service temperature of 117° C. Water absorption after 48 h water boil was 2.02%.

EXAMPLE 6

10% Elf Atochem ATO POLY BD 600 with TACTIX 123

Elf Atochem ATO POLY BD 600 VM 312051 (internally epoxidized 1,3-butadiene homopolymer), (60 g), OPPI (18 g), and Dow TACTIX 123 (540 g) was mixed at approximately 80° C. Viscosity of the solution was 6120 cp at 24° C. Specimens were cured as described in Example 1. Fracture toughness was 0.594 MPa m$^{1/2}$ and 0.463 MPa m$^{1/2}$ at 25° C. and −100° C., respectively. Glass transition temperature was 166° C. (Tan delta) and 151° C. (G"). Flexural modulus was 2.68 GPa at 25° C. with an initial service temperature of 123° C. Water absorption after 48 h water boil was 1.28%.

EXAMPLE 7

10% PARALOID EXL-2330 with TACTIX 123

Rohm and Haas PARALOID EXL-2330 methacrylate-butadiene core shell rubber (30 g) was stirred overnight with 30 g of acetone. The suspension was mixed with Dow TACTIX 123 (270 g) at room temperature and the acetone removed under vacuum at approximately 80° C. OPPI (9 g) was added with mixing at 80° C. until it was in solution (0.5 h). Specimens were cured as described in Example 1. Fracture toughness was 0.585 MPa m$^{1/2}$ at 25° C. Glass transition temperature was 132° C. (Tan delta) and 132° C. (G"). Flexural modulus was 2.69 GPa at 25° C. with an initial service temperature of 109° C. Water absorption after 48 h water boil was 2.59%.

EXAMPLE 8

30% Dow XU 71790.04L with TACTIX 123 and TACTIX 556 (28:42)

Dow XU 71790.04L (bisphenol A based glycidyl ether reacted with acrylic rubber), (90 g), Dow TACTIX 123 (84 g), Dow TACTIX 556 (126 g), and OPPI (9 g) was mixed at approximately 90° C. Specimens were cured as described in Example 1. Fracture toughness was 0.411 MPa m$^{1/2}$ and 0.520 MPa m$^{1/2}$ at 25 and −100° C., respectively. Glass transition temperature was 176° C. (Tan delta) and 161° C. (G"). Flexural modulus was 2.48 GPa at 25° C. with an initial service temperature of 137° C. Water absorption after 48 h water boil was 2.22%.

EXAMPLE 9

10% KRATON FG 1901X with TACTIX 123

Shell KRATON FG 1901X, a styrene-ethylene/butylene-styrene block copolymer terminated with maleic anhydride, (60g) was dissolved in 300 mL of toluene. The KRATON solution was added to 540 g of Dow TACTIX 123 and the mixture stirred overnight at approximately 60° C. Toluene was removed under vacuum at approximately 90° C. OPPI (18 g) was added and dissolved in the stirred mixture at 90° C. (approximately 0.5 hour). The final mixture was a milky white suspension with a viscosity of 1100 cPs at 60° C. Specimens were cured as described in Example 1. Fracture toughness was determined to be 0.92 MPa $m^{1/2}$ at 25° C. and 1.224 Mpa $m^{1/2}$ at −100° C. Glass transition temperature was 171° C. (Tan delta). The temperature at which the flexural modulus drops to one-half its value from 25° C. was 131° C.

In addition to solvent mixing, KRATON FG 1901X was also mechanically blended into the epoxy resin by using a Silverson high shear mixer/emulsifier. The solid rubber was blended into the epoxy at approximately 7000 RPM for 0.5 hour at 190°–200° C.

Additionally, it is expected that the toughened resin system may be reinforced with fibers which may include carbon, graphite, glass, aramid, polyethylene, or other reinforcement fibers to form a composite. Fillers such as clay, minerals, glass particles, silica particles, alumina particles, aluminum powder and other inert materials may also be added. The epoxy resin system can thus be used as part of an electron beam (EB) curable polymer matrix composite (PMC).

Mechanical, thermal, and physical properties for electron beam cured carbon-fiber-reinforced composite laminates, incorporating some of the above described toughened epoxy resin systems as well as examples of some untoughened epoxy resin systems, are described in Table 5 and Table 6. These properties include those tested at room temperature as well as those determined after cycling several times from low temperatures (−194° C. or −79° C. ) to elevated temperatures (121° C.).

The impetus for developing EB curing of polymer matrix composites that incorporate toughened epoxy resins is based primarily on reducing the manufacturing costs and cycle times in comparison with traditional thermal curing processes. One of the primary cost drivers in manufacturing with PMCs, and one of the elements having the greatest effect on quality and performance, is the standard thermal cure process. Thermal cure of PMCs requires relatively long cure times and high-energy consumption, creates residual thermal stresses, produces volatile toxic by-products during cure, requires the use of hardeners (curing agents) which limit the shelf life of the resin system, requires resin systems to be stored and transported under low temperature conditions before cure, and requires expensive tooling that is tolerant of high temperatures (i.e., 250 to 750° F.).

The high energy ionizing radiation has a dose rate greater than about 0.75 kilogray/sec or equal to or greater than about 100 kilogray/sec.

EB curing is a nonthermal curing method that uses high-energy, high-power electrons to initiate polymerization and cross-linking reactions at controlled rates in EB curable materials to enhance specific physical, mechanical, and chemical properties. EB curing can eliminate or reduce many of the shortcomings of thermal curing and facilitate technical developments that are presently unachievable utilizing thermal curing technology.

Four advantages are offered by EB curing compared to traditional Thermal Curing

Lower Manufacturing Costs: resulting from faster cures, lower energy consumption, the ability to use lighter and lower cost tooling, simplified transportation and storage of resin systems, and easier waste cleanup after fabrication.

Simplified Processing: resulting from selectable cure temperatures, minimal part and tool thermal mismatches, uniform and efficient cross-linking, unlimited resin pot life, elimination of hardeners in the resin system, reduction in resin viscosity variations, greater material integration flexibility, in-situ fabrication and curing capability, ability to cure parts up to about 12-inches thick, absence of part size limitations, and ability to retrofit to traditional fabrication methods (i.e., automated tape and tow and fiber placement, filament winding, pultrusion, resin transfer molding, etc).

Environmentally Friendly: because it reduces toxic and volatile emissions and minimizes the use of solvents normally required for waste clean-up operations.

Improved Product Performance: by lowering residual and internal stresses, improving dimensional part quality, and providing an ability to tailor the material properties by controlling the cure depth and the degree of cure.

The present invention provides the user an almost unlimited number of epoxy resin systems, incorporating epoxy resins, cationic initiators, and toughening materials and combinations thereof, to choose from which meet the necessary performance requirements for given applications.

The benefits of PMCs have long been recognized for high-performance applications, but American industry has not capitalized on the advantages of these materials because large-scale manufacturing of PMCs is cost prohibitive. One of the primary cost drivers in manufacturing PMC parts and structures is the manufacturing cycle times required to cure the materials. By utilizing these toughened EB-curable materials discussed in this subject invention one can dramatically shorten the manufacturing time for producing these materials, thereby greatly improving the affordability and use of PMCs in many areas of the commercial sector, including aircraft, aerospace, automotive, marine, sporting goods, infrastructure, and construction industries.

Many companies involved in the manufacture of aircraft and aerospace products, automobiles, chemicals, adhesives, polymer matrix composites, marine products, reinforcement fibers, oil drilling platforms, and electron beam accelerators are extremely interested in this technology area.

The toughened epoxy materials described in this invention also have enormous potential for reducing the final cost and improving the performance for products used in applications such as thick and thin coatings; tooling for manufacturing PMCs; encapsulants for electronic devices; adhesives for bonding PMCs, metals, ceramics, and other materials; and for manufacturing molded and cast parts.

While there has been shown and described what is at present considered the preferred embodiments of the invention, it will be obvious to those skilled in the art that various changes and modifications may be made therein without departing from the scope of the invention as defined by the appended claims.

TABLE 1

Toughening of Radiation Cured Epoxy Resins with Engineering Thermoplastics and Hydroxy-Terminated Thermoplastic Oligomers[1,2]

| Toughening Agent | Toughening Agent Concentration (%) | Epoxy Resin | Glass Transition Temperature (°C.) Tan Delta | Glass Transition Temperature (°C.) G" | Initial Service Temperature[3] (°C.) | Flexural Modulus E' (estimated) 25° C. (GPa) | Weight Gain (48 h $H_2O$ Boil) (%) | Fracture Toughness $K_{1c}$ (MPa m$^{1/2}$) |
|---|---|---|---|---|---|---|---|---|
| Control | None | Tactix 123 | 163 | 145 | 120 | 3.04 | 1.41 | 0.411 (25° C.) |
| Udel P-1700 NT | 10 | Tactix 123 | 168 | 156 | 132 | 2.94 | 1.25 | 0.680 (25° C.) 0.899 (−100° C.) |
| Udel P-1700 NT | 20 | Tactix 123 | 156 | 144 | 128 | 2.85 | 0.95 | 0.746 (25° C.) 1.254 (−100° C.) |
| Radel A-200 NT | 10 | Tactix 123 | 177 | 162 | 141 | 2.79 | 1.38 | 0.549 (25° C.) |
| Radel A-200 NT | 20 | Tactix 123 | 168 | 143 | 129 | 2.68 | 1.37 | 0.494 (25° C.) 0.612 (−100° C.) |
| Ultem 1000-1000 | 10 | Tactix 123 | 175 | 157 | 136 | 3.07 | 1.37 | 0.696 (25° C.) 0.877 (−100° C.) |
| Ultem 1000-1000 | 20 | Tactix 123 | 189 | 174 | 155 | 3.04 | 1.69 | 0.691 (25° C.) 0.793 (−100° C.) |
| Ultem 1010-1000 | 10 | Tactix 123 | 173 | 158 | 133 | 3.04 | 1.37 | 0.585 (25° C.) 0.734 (−100° C.) |
| Ultem 1010-1000 | 20 | Tactix 123 | 175 | 160 | 141 | 3 | 1.69 | 0.713 (25° C.) 0.668 (−100° C.) |
| Ultem 1040-1000 | 10 | Tactix 123 | 173 | 158 | 133 | 2.94 | 1.33 | 0.447 (25° C.) |
| Ultem 1040-1000 | 20 | Tactix 123 | 177 | 158 | 142 | 2.9 | 1.63 | 0.459 (25° C.) 0.716 (−100° C.) |
| Orgasol 2001 | 20 | Tactix 123 | 163 | 138 | 79 | 2.64 | 2.49 | 0.667 (25° C.) |
| Orgasol 3501 | 5 | Tactix 123 | | | | | | 0.614 (25° C.) |
| IMITEC X-902 | 5 | Tactix 123 | 164 | 146 | 124 | 3.05 | 1.64 | 0.442 (25° C.) |
| IMITEC X-902 | 10 | Tactix 123 | 161 | 144 | 124 | 3.19 | 1.63 | 0.774 (25° C.) |
| IMITEC X-902 | 20 | Tactix 123 | 161 | 146 | 128 | 3.45 | 1.81 | 0.481 (25° C.) |
| Hydroxy-Terminated Polysulfone Oligomer; Mn, 1500 g/mole | 5 | Tactix 123 | 173 | 160 | 137 | 2.94 | 1.06 | 0.508 (25° C.) |
| Hydroxy-Terminated Polysulfone Oligomer; Mn, 1500 g/mole | 20 | Tactix 123 | 155 | 143 | 132 | 2.94 | 1.21 | 0.536 (25° C.) 0.746 (−100° C.) |
| Hydroxy-Terminated Polysulfone Oligomer: Mn, 1500 g/mole | 30 | Tactix 123 | 160 | 145 | 120 | 3.25 | 2.56 | 0.557 (25° C.) 0.652 (−100° C.) |
| Hydroxy-Terminated Polysulfone Oligomer: Mn, 2650 g/mole | 20 | Tactix 123 | 149 | 134 | 122 | 3.18 | 1.57 | 0.700 (25°° C.) |
| Hydroxy-Terminated Polysulfone Oligomer: Mn, 5360 g/mole | 20 | Tactix 123 | 150 | 134 | 123 | 3.19 | 2.38 | 0.731 (25° C.) |
| Hydroxy-Terminated Polysulfone Oligomer: Mn, 6000 g/mole | 5 | Tactix 123 | 171 | 156 | 130 | 2.89 | 1.15 | 0.475 (25° C.) |
| Hydroxy-Terminated Polysulfone Oligomer: Mn, 6000 g/mole | 20 | Tactix 123 | 159 | 150 | 135 | 2.81 | 1.26 | 0.593 (25° C.) 0.871 (−100° C.) |
| Hydroxy-Terminated Polysulfone Oligomer: Mn, 6000 g/mole | 30 | Tactix 123 | 161 | 149 | 134 | 3.02 | 1.64 | 0.705 (25° C.) 1.114 (−100° C.) |
| Hydroxy-Terminated Polysulfone Oligomer: Mn, 8890 g/mole | 20 | Tactix 123 | 154 | 136 | 122 | 3.32 | 1.77 | 0.738 (25° C.) |
| Udel P-1700 NT | 15 | ERL 2258 | 176 | | 112 | | | |
| Udel P-1700 NT | 20 | ERL 2258 | 164 | | 87 | | | 0.755 (25° C.) |
| Udel P-1700 NT | 10 | Tactix 742/ ERL 2258 (45:45) | 106 | | 65 | | | 0.643 (25° C.) |
| Udel P-1700 NT | 11 | Tactix 556/ ERL 2258 (44.5:44.5) | 157 | | 75 | | | 0.805 (25° C.) |

[1] All formulations contained OPPI at a concentration of 3 phr.
[2] All specimens were cured using a total dosage of 150 kGy.
[3] Initial service temperature is defined as the temperature at which the modulus is at 50% of its value at 25° C.

TABLE 2

Toughening of Radiation Cured Epoxy Resins with Reactive Flexibilizers[1,2]

| Toughening Agent | Toughening Agent Concentration (%) | Epoxy Resin | Glass Transition Temperature (°C.) Tan Delta | Glass Transition Temperature (°C.) G" | Initial Service Temperature[3] (°C.) | Flexural Modulus E' (estimated) 25° C. (GPa) | Weight Gain (48 h H$_2$O Boil) (%) | Fracture Toughness K$_{1c}$ (MPa m$^{1/2}$) |
|---|---|---|---|---|---|---|---|---|
| Control | None | Tactix 123 | 163 | 145 | 120 | 3.04 | 1.41 | 0.411 (25° C.) |
| Dow DER 732 | 10 | Tactix 123 | | | | | | 0.423 (25° C.) |
| Dow DER 736 | 10 | Tactix 123 | | | | | | 0.569 (25° C.) |
| Shell Heloxy 32 | 10 | Tactix 123 | | | | | | 0.487 (25° C.) |
| Shell Heloxy 68 | 10 | Tactix 123 | 158 | | 135 | | | 0.534 (25° C.) |
| | | | | | | | | 0.552 (−100° C.) |
| Shell Heloxy 71 | 10 | Tactix 123 | | | | | | 0.529 (25° C.) |
| Shell Heloxy 505 | 10 | Tactix 123 | | | | | | 0.480 (25° C.) |
| | | | | | | | | 0.708 (−100°) |
| Elf Atochem ATO POLY bd 600 | 10 | Tactix 123 | 166 | 151 | 123 | 2.68 | 1.28 | 0.594 (25° C.) |
| | | | | | | | | 0.463 (−100° C.) |
| Elf Atochem ATO POLY bd 605 | 10 | Tactix 123 | 163 | 148 | 124 | 2.85 | 1.62 | 0.420 (25° C.) |
| Elf Atochem ATO Vikoflex 7010 | 10 | Tactix 123 | 139 | 121 | 101 | 2.82 | | 0.592 (25° C.) |
| Elf Atochem ATD Vikoflex 7170 | 5 | Tactix 123 | | | | | | 0.467 (25° C.) |
| Elf Atochem ATD Vikoflex 7170 | 10 | Tactix 123 | 151 | 133 | 117 | 2.79 | 2.02 | 0.598 (25° C.) |
| | | | | | | | | 0.752 (−100°) |
| Elf Atochem ATD Vikoflex 7170 | 20 | Tactix 123 | 134 | | 113 | | | 0.559 (25°) |
| Elf Atochem ATD Vikoflex 7170 | 30 | Tactix 123 | 118 | | 94 | | | 0.596 (25° C.) |
| Elf Atochem ATD Vikoflex 7190 | 10 | Tactix 123 | 172 | | 137 | | | 0.479 (25° C.) |
| Elf Atochem ATO Vikolox 14 | 10 | Tactix 123 | 130 | 112 | 97 | 2.63 | 1.12 | 0.491 (25° C.) |
| Union Carbide Tone 301 | 10 | Tactix 123 | | | | | | 0.810 (25° C.) |
| Union Carbide Tone 310 | 10 | Tactix 123 | | | | | | 0.621 (25° C.) |
| Elf Atochem ATO Vikoflex 7170 | 15 | Tactix 556 | 175 | | 150 | | | 0.555 (25° C.) |
| Shell Heloxy 32 | 30 | Tactix 742 | | | | | | Plaques Exothermed |

[1]All formulations contained OPPI at a concentration of 3 phr.
[2]All specimens were cured using a total dosage of 150 kGy.
[3]Initial service temperature is defined as the temperature at which the modulus is at 50% of its value at 25° C.

TABLE 3

Toughening of Radiation Cured Epoxy Resins with Rubbers and Elastomers[1,2]

| Toughening Agent | Toughening Agent Concentration (%) | Epoxy Resin | Glass Transition Temperature (°C.) Tan Delta | Glass Transition Temperature (°C.) G" | Initial Service Temperature[3] (°C.) | Flexural Modulus E' (estimated) 25° C. (GPa) | Weight Gain (48 h H$_2$O Boil) (%) | Fracture Toughness K$_{1c}$ (MPa m$^{1/2}$) |
|---|---|---|---|---|---|---|---|---|
| Control | None | Tactix 123 | 163 | 145 | 120 | 3.04 | 1.41 | 0.411 (25° C.) |
| Ciba PY 322 | 5 | Tactix 123 | 164 | 148 | 121 | 2.9 | 1.06 | 0.513 (25° C.) |
| Ciba PY 322 | 10 | Tactix 123 | 153 | 138 | 118 | 2.89 | 1.05 | 0.488 (25° C.) |
| Ciba PY 322 | 20 | Tactix 123 | 132 | 119 | 107 | 2.65 | 1.06 | 0.630 (25° C.) |
| Dow XU 71790.04L | 20 | Tactix 123 | 166 | 161 | 121 | 2.75 | 2.00 | 0.565 (25° C.) |
| Dow XU 71790.04L | 30 | Tactix 123 | 164 | 152 | 124 | 2.39 | 2.12 | 0.410 (25° C.) |
| Dow XU 71790.04L | 30 | Tactix 123/ Tactix 556 (28:42) | 176 | 161 | 137 | 2.48 | 2.22 | 0.411 (25° C.) |
| | | | | | | | | 0.520 (−100° C.) |
| Rohm & Haas Paraloid EXL-2330 | 5 | Tactix 123 | 147 | 129 | 111 | 2.84 | 2.62 | 0.492 (25° C.) |
| Rohm & Haas Paraloid EXL-2330 | 10 | Tactix 123 | 132 | 132 | 109 | 2.69 | 2.59 | 0.585 (25° C.) |
| Rohm & Haas Paraloid EXL-2330 | 15 | Tactix 123 | 129 | 111 | 92 | 2.31 | 2.47 | 0.600 (25° C.) |
| Rohm & Haas | 20 | Tactix 123 | 122 | 104 | 81 | 1.97 | 2.19 | 0.572 (25° C.) |

TABLE 3-continued

Toughening of Radiation Cured Epoxy Resins with Rubbers and Elastomers[1,2]

| Toughening Agent | Toughening Agent Concentration (%) | Epoxy Resin | Glass Transition Temperature (°C.) Tan Delta | Glass Transition Temperature (°C.) G" | Initial Service Temperature[3] (°C.) | Flexural Modulus E' (estimated) 25° C. (GPa) | Weight Gain (48 h H$_2$O Boil) (%) | Fracture Toughness K$_{1c}$ (MPa m$^{1/2}$) |
|---|---|---|---|---|---|---|---|---|
| Paraloid EXL-2330 Shell Epon 58134 | 10 | Tactix 123 | 183 | | 158 | | | 0.618 (25° C.) |
| Shell Epon 58134 | 30 | Tactix 123 | 88 | | | | | 0.560 (25° C.) |
| Shell Epon 58134 | 100 | None | 142 | | 108 | | | 0.635 (25° C.) |
| Shell Kraton FG 1901X (Solvent Mixed) | 10 | Tactix 123 | 171 | | 131 | | | 0.919 (25° C.) 1.224 (−100° C.) |
| Shell Kraton FG 1901X (Solvent Mixed) | 20 | Tactix 123 | 86/176 | | 111 | | | 0.841 (25° C.) 1.124 (−100° C.) |

[1]All formulations contained OPPI at a concentration of 3 phr.
[2]All specimens were cured using a total dosage of 150 kGy.
[3]Initial service temperature is defined as the temperature at which the modulus is at 50% of its value at 25° C.

TABLE 4

Toughening of Radiation Cured Epoxy Resins with Mixtures of Tougheners

| Toughening Agent | Toughening Agent Concentration (%) | Epoxy Resin | Glass Transition Temperature (°C.) Tan Delta | Glass Transition Temperature (°C.) G" | Initial Service Temperature[3] (°C.) | Flexural Modulus E' (estimated) 25° C. (GPa) | Weight Gain (48 h H$_2$O Boil) (%) | Fracture Toughness K$_{1c}$ (MPa m$^{1/2}$) |
|---|---|---|---|---|---|---|---|---|
| Control | None | Tactix 123 | 163 | 145 | 120 | 3.04 | 1.41 | 0.411 (25° C.) |
| Udel P-1700 NT Shell Heloxy 68 | 10 10 | Tactix 123 | 158 | | 138 | | | 0.766 (25° C.) 1.025 (−100° C.) |
| Udel P-1700 NT Shell Heloxy 71 | 10 10 | Tactix 123 | 90 | | | | | 0.708 (25° C.) 0.932 (−100° C.) |
| Udel P-1700 NT Shell Heloxy 505 | 10 10 | Tactix 123 | 153 | | 124 | | | 0.707 (25° C.) |
| Udel P-1700 NT Dow DER 732 | 10 10 | Tactix 123 | | | | | | 0.885 (25° C.) |
| Udel P-1700 NT Elf Atochem ATO Vikoflex 7170 | 10 10 | Tactix 123 | 153 | | 128 | | | 0.716 (25° C.) 1.058 (−100° C.) |
| Udel P-1700 NT Elf Atochem ATO Vikoflex 7170 | 18 10 | Tactix 123 | 140 | | 98 | | | 0.858 (25° C.) |
| Udel P-1700 NT Elf Atochem ATO Vikoflex 7170 | 20 20 | Tactix 123 | 151 | | 104 | | | 0.965 (25° C.) |
| Udel P-1700 NT Elf Atochem ATO Vikoflex 7190 | 10 10 | Tactix 123 | 80 | | | | | 0.772 (25° C.) |
| Udel P-1700 NT Hydroxy-Terminated Polysulfone Oligomer; Mn, 6000 g/mole | 10 10 | Tactix 123 | 171 | | 153 | | | 0.799 (25° C.) 1.003 (−100° C.) |
| Udel P-1700 NT Hydroxy-Terminated Polysulfone Oligomer; Mn 6000 g/mole Elf Atochem ATO Vikoflex 7170 | 10 10 10 | Tactix 123 | 151 | | 120 | | | 0.538 (25° C.) |
| Udel P-1700 NT Rhone-Poulenc Heloxy 69 | 15 42.5 | Tactix 556 | 185 | | 172 | | | 0.734 (25° C.) 0.935 (−100° C.) |

[1]All formulations contained OPPI at a concentration of 3 phr.
[2]All specimens were cured using a total dosage of 150 kGy.
[3]Initial service temperature is defined as the temperature at which the modulus is at 50% of its value at 25° C.

TABLE 5

Electron Beam Cured Composite Laminate Properties

| Prepreg Resin System[1] | Tg, °C, (Tan delta) | [2]Initial Service Temperature (°C.) | Resin Viscosity @ 70° C., cps (Debulk Temp.) | % Fiber Volume, ASTM D 3171 | % Void Vol., ASTM D 3171 (resin density = 1.2) | [3]Room Temp. 0° Flexural Strength, ksi | [3]Room Temp. 0° Flexural Modulus, msi | [3,4]RT 0° Flex. Str., ksi; [AFTER CYCLING] | [3,4]RT 0° Flex. Mod., msi; [AFTER CYCLING] | [3]Room Temp. 0° ILSS, ksi | [3,4]Room Temp. 0° ILSS, ksi; [AFTER CYCLING] |
|---|---|---|---|---|---|---|---|---|---|---|---|
| Tactix 123 (73.9%)/DER 661 (13%)/Udel P-1700 NT (13%)/OPPI (3 phr) | 103, 175 | 103 | 44,750 | 60.16 | 2.62 | 160 | 19.2 | 195 (176) | 21.9 (20.8) | 11 | 11.9 (11.4) |
| Tactix 123 (65.2%)/DER 661 (13%)/Udel P-1700 NT (13%)/ATO Vikoflex 7170 (8.7%)/OPPI (3 phr) | 89, 160 | 153 | 37,200 | 59.6 | 2.77 | 189 | 21.6 | 183 (177) | 20.5 (20.5) | 11.1 | 10.6 (11.8) |
| Tactix 123 (9%)/Tactix 556 (81%)/Kraton FG 1901X (10%)/OPPI (3 phr) | 210 | 204 | 27,100 | 51.02 | 6.06 | 153 | 21.4 | 169 (145) | 22.4 (20.1) | 7.3 | 7.9 (9.1) |
| Epon 828 (44.73%), Kraton FG 1901X (7.9%)/DER 661 (47.36%)/OPPI (3 phr) | 147 | 145 | 28,600 | 59.96 | 2.06 | 147 | 20.2 | 151 (146) | 20.2 (19.7) | 7.2 | 6.6 (7) |
| Tactix 742 (70.06%)/DER 332 (16.9%)/DER 661 (13%)/OPPI (3.09 phr) | 157, 420 | 212 | 7,450 | 57.74 | 1.2 | 190 | 20.3 | 192 (190) | 21.5 (21.3) | 10.1 | 10.7 (11.2) |
| Tactix 123 (68.64%)/DER 661 (8.48%)/Hydroxy terminated Polysulfone Mn, 6000 g/mole (22.88%)/OPPI (2.75 phr) | 94, 172 | 107 | 11,500 | 62.22 | 2.6 | 157 | 18.6 | 151 (156) | 18.1 (18.5) | 9 | 10.8 (11.1) |
| Tactix 123 (8.1%)/Tactix 556 (72.8%)/DER 661 (9.9%)/Shell EKP 206 (9.3%)/OPPI (2.97 phr) | 202 | 197 | 10,800 | 59.57 | 5.6 | 169 | 19.9 | 175 (164) | 20.9 (21.1) | 6.7 | 8 (9.2) |
| Tactix 123 (14.7%)/Tactix 556 (58.7%)/DER 661 (18.8%)/Shell EKP 207 (10%)/OPPI (3 phr) | 137, 195 | 185 | 11,400 | 53.28 | 2.9 | 171 | 22 | 181 (180) | 22.6 (22.7) | 7.3 | 8.4 (8.5) |
| Tactix 742 (100%)/OPPI (3 phr) | 435 | 344 | 10,200 | 60.52 | 4.36 | 188 | 21.1 | 211 (195) | 21.6 (20.4) | 6.8 | 7.7 (8) |
| Tactix 742 (85%)/Shell EKP 206 (15%)/OPPI (3 phr) | 128, 435 | 365 | 22,300 | 57.47 | 4.23 | 159 | 20.1 | 184 (172) | 20.5 (20.7) | 5.8 | 7.1 (7.5) |

TABLE 5-continued

Electron Beam Cured Composite Laminate Properties

| Prepreg Resin System[1] | Tg, °C, (Tan delta) | [2]Initial Service Temperature (°C.) | Resin Viscosity @ 70° C., cps (Debulk Temp.) | % Fiber Volume, ASTM D 3171 | % Void Vol., ASTM D 3171 (resin density = 1.2) | [3]Room Temp. 0° Flexural Strength, ksi | [3]Room Temp. 0° Flexural Modulus, msi | [3,4]RT 0° Flex. Str., ksi; [AFTER CYCLING] | [3,4]RT 0° Flex. Mod., msi; [AFTER CYCLING] | [3]Room Temp. 0° ILSS, ksi | [3,4]Room Temp. 0° ILSS, ksi; [AFTER CYCLING] |
|---|---|---|---|---|---|---|---|---|---|---|---|
| Tactix 742 (85%)/Shell EKP 207 (15%)/OPPI (3 phr) | 144, 435 | 365 | 23,100 | 57.59 | 6.75 | 155 | 21 | 175 (163) | 19.9 (20.7) | 5.5 | 6.5 (7) |

[1]Unidirectional carbon fiber prepreg (Hercules carbon fiber IM7/GP-12K) laminates laid up at a nominal thickness of 0.080-inches and hot debulked at 70° C. for 1 hour. Laminates electron beam cured at a dose of 150 kGy.
[2]Initial Service Temperature is defined as the temperature at which the DMA modulus is at 50% of its value at 25° C.
[3]Flexural strength and modulus determined using ASTM D 790; 3 point bend, span/depth = 32. Normalized to 60% fiber volume. Interlaminar shear strength (ILSS) determined using ASTM D 2344; Short beam shear method, span/depth = 4.
[4]CYCLING Procedure: Specimens placed in −78.5° C. (or −194° C.) for 30 minutes (min.); returned to room temperature (RT) for 30 min; placed in oven at 121° C. for 30 min; returned to RT for 30 min.; procedure performed 3 times. Tested at RT.

TABLE 6

Electron Beam Cured Composite Laminate Thermal Properties

| Prepreg Resin System* | Tg, °C. (Tan Delta by Dynamic Mechanical Analysis) | Resin Viscosity @ 70° C. (cps) |
|---|---|---|
| TACTIX 123 (74%)/DER 661 (13%)/Udel P-1700 NT (13%)/Sartomer CD-1012 (3 phr) | 182 | 44,750 |
| TACTIX 123 (55%)/TACTIX 556 (35%)/UDEL P-1700 NT(10%)/Sartomer CD-1012 (3 phr) | 202 | 21,700 |
| TACTIX 123 (55%)/TACTIX 742 (35%)/UDEL P-1700 NT (10%)/Sartomer CD-1012 (3 phr) | 212 | 25,700 |
| TACTIX 123 (50%)/DEN 438 (40%)/UDEL P-1700 NT (10%)/Sartomer CD-1012 (3 phr) | 212 | 27,400 |

*Unidirectional carbon fiber prepreg (Hercules carbon fiber, IM7/GP-12K) laminates electron beam cured with a dose of 150 kGy.

What is claimed is:

1. A method for making a toughened non-thermally cured epoxy resin system comprising the following steps:

Step 1. providing an epoxy resin composition comprising an epoxy resin, a cationic initiator, and a toughening agent wherein said cationic initiator is a diaryliodonium salt said toughening agent being selected from the group consisting of a thermoplastic, a reactive flexibilizer, an elastomer and mixtures thereof; and Step 2. exposing said epoxy resin composition to high energy ionizing radiation having an instantaneous dose rate greater than about 0.75 kilogray/sec for a period of time sufficient to cure said epoxy resin composition thereby forming a toughened non-thermally cured epoxy resin system.

2. A method for making a toughened non-thermally cured epoxy resin system in accordance with claim 1 wherein said diaryliodonium salt has an anion, said anion is selected from the group consisting of hexafluoroarsenate ($AsF_6$), hexafluoroantimonate ($SbF_6$), hexafluorophosphate ($PF_6$), boron tetrafluoride ($BF_4$), trifluoromethane sulfonate ($CF_3SO_3$), tetrakis (pentafluorophenyl) borate, ($B[C_6F_5]_4$) tetrakis [3,5-bis(trifluoromethyl) phenyl]borate ($B[C_6H_3(CF_3)_2]_4$) and mixtures thereof.

3. A method for making a toughened non-thermally cured epoxy resin system in accordance with claim 1 wherein said high energy ionizing radiation has a dose rate equal to or greater than about 100 kilogray/sec.

4. A method for making a toughened non-thermally cured epoxy resin system in accordance with claim 1 wherein said thermoplastic is a hydroxy-containing thermoplastic oligomer or an epoxy-containing thermoplastic oligomer.

5. A method for making a toughened non-thermally cured epoxy resin system in accordance with claim 1 wherein said epoxy resin composition further comprises one or more fibers selected from the group consisting of carbon, graphite, glass, aramid, polyethylene and mixtures thereof.

6. A method for making a toughened non-thermally cured epoxy resin system in accordance with claim 1 wherein said epoxy resin composition further comprises one or more fillers selected from the group consisting of clay, minerals, glass particles, silica particles, alumina particles, aluminum powder and mixtures thereof.

7. A method for making a toughened non-thermally cured epoxy resin system in accordance with claim 1 wherein said toughening agent is selected from the group consisting of a hydroxy-terminated thermoplastic oligomer, an epoxy-terminated thermoplastic oligomer, rubber and mixtures thereof.

8. A toughened non-thermally cured epoxy resin system made in accordance with claim 1.

* * * * *